US012600327B2

(12) United States Patent
Sasahara et al.

(10) Patent No.: US 12,600,327 B2
(45) Date of Patent: Apr. 14, 2026

(54) DRIVING ASSISTANCE APPARATUS, DRIVING ASSISTANCE METHOD, AND NON-TRANSITORY STORAGE MEDIUM

(71) Applicant: ISUZU MOTORS LIMITED, Yokohama (JP)

(72) Inventors: Tomoya Sasahara, Fujisawa (JP); Noriyuki Tsukada, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 93 days.

(21) Appl. No.: 18/887,446

(22) Filed: Sep. 17, 2024

(65) Prior Publication Data

US 2025/0121804 A1    Apr. 17, 2025

(30) Foreign Application Priority Data

Oct. 13, 2023    (JP) ................................ 2023-177554

(51) Int. Cl.
*B60T 7/12*                (2006.01)
(52) U.S. Cl.
CPC ......... *B60T 7/122* (2013.01); *B60T 2201/022* (2013.01)
(58) Field of Classification Search
CPC ... B60T 7/122; B60T 7/22; B60T 7/17; B60T 7/12; B60T 2201/022
See application file for complete search history.

(56) References Cited

U.S. PATENT DOCUMENTS

| | | | |
|---|---|---|---|
| 2018/0043896 A1* | 2/2018 | Lee ................. | B60W 30/18127 |
| 2019/0366991 A1* | 12/2019 | Tsuchiya ................... | B60T 7/12 |
| 2021/0009112 A1* | 1/2021 | Alzaydi .............. | B60R 21/0132 |
| 2022/0118957 A1* | 4/2022 | Miyake ................. | B60T 13/662 |

FOREIGN PATENT DOCUMENTS

| | | |
|---|---|---|
| JP | 2001018770 A | 1/2001 |
| JP | 2004-295620 A | 10/2004 |
| JP | 2023000507 A | 1/2023 |

* cited by examiner

*Primary Examiner* — George C Jin
(74) *Attorney, Agent, or Firm* — Shih IP Law Group, PLLC

(57)                ABSTRACT

A driving assistance apparatus includes a first acquisition part that acquires a first braking force enabling avoidance of a collision between a reversing vehicle that is reversing and a moving object approaching the reversing vehicle, a second acquisition part that acquires a second braking force on the basis of an amount of brake pedal depression, and a braking control part that causes the reversing vehicle to generate the first braking force if the first braking force is smaller than a maximum braking force of the reversing vehicle and the second braking force determined on the basis of the amount of brake pedal depression is smaller than the first braking force.

12 Claims, 5 Drawing Sheets

DRIVING ASSISTANCE APPARATUS, DRIVING ASSISTANCE METHOD, AND NON-TRANSITORY STORAGE MEDIUM

CROSS-REFERENCE TO RELATED APPLICATIONS

The present application claims priority to Japanese Patent Applications number 2023-177554, filed on Oct. 13, 2023, contents of which are incorporated herein by reference in their entirety.

BACKGROUND OF THE INVENTION

The present disclosure relates to a driving assistance apparatus, a driving assistance method, and a non-transitory storage medium for assisting a driving operation of a driver. A technique for avoiding a collision between a vehicle and a moving object is known. For example, Japanese Unexamined Patent Application Publication No. 2004-295620 discloses a technique of generating a maximum braking force achievable by a braking device of a vehicle that is reversing upon determining that a collision between the vehicle and a moving object (for example, another vehicle) is unavoidable on the basis of a relative position and a relative speed of the moving object with respect to the vehicle.

A distance between a reversing vehicle that is reversing and a moving object is sometimes detected to be shorter than the actual distance. In this case, it is sometimes determined that a collision between the reversing vehicle and the moving object cannot be avoided even though the collision between the reversing vehicle and the moving object actually is avoidable, resulting in a maximum braking force being generated.

BRIEF SUMMARY OF THE INVENTION

The present disclosure focuses on this point, and an object thereof is to prevent a braking force from being excessive when avoiding a collision between a reversing vehicle and a moving object.

MEANS FOR SOLVING THE PROBLEMS

A first aspect of the present disclosure provides a driving assistance apparatus that includes a first acquisition part that acquires a first braking force enabling avoidance of a collision between a reversing vehicle that is reversing and a moving object approaching the reversing vehicle, a second acquisition part that acquires a second braking force on the basis of an amount of brake pedal depression, and a braking control part that causes the reversing vehicle to generate the first braking force if the first braking force is smaller than a maximum braking force of the reversing vehicle (1) and the second braking force is smaller than the first braking force.

A second aspect of the present disclosure provides a method for controlling a driving assistance apparatus, executed by a processor mounted on a reversing vehicle that is reversing, the method includes the steps of acquiring a first braking force enabling avoidance of a collision between the reversing vehicle and a moving object approaching the reversing vehicle, acquiring a second braking force on the basis of an amount of brake pedal depression, and causing the reversing vehicle to generate the first braking force if the first braking force is smaller than a maximum braking force of the reversing vehicle and the second braking force is smaller than the first braking force.

A third aspect of the present disclosure provides a non-transitory storage medium storing a program for causing a processor, mounted on a reversing vehicle that is reversing, to function as a first acquisition part that acquires a first braking force enabling avoidance of a collision between the reversing vehicle and a moving object approaching the reversing vehicle, a second acquisition part that acquires a second braking force on the basis of an amount of brake pedal depression, and a braking control part that causes the reversing vehicle to generate the first braking force if the first braking force is smaller than a maximum braking force of the reversing vehicle (1) and the second braking force is smaller than the first braking force.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

[Configuration of Driving Assistance Apparatus 6]

Figure 1:
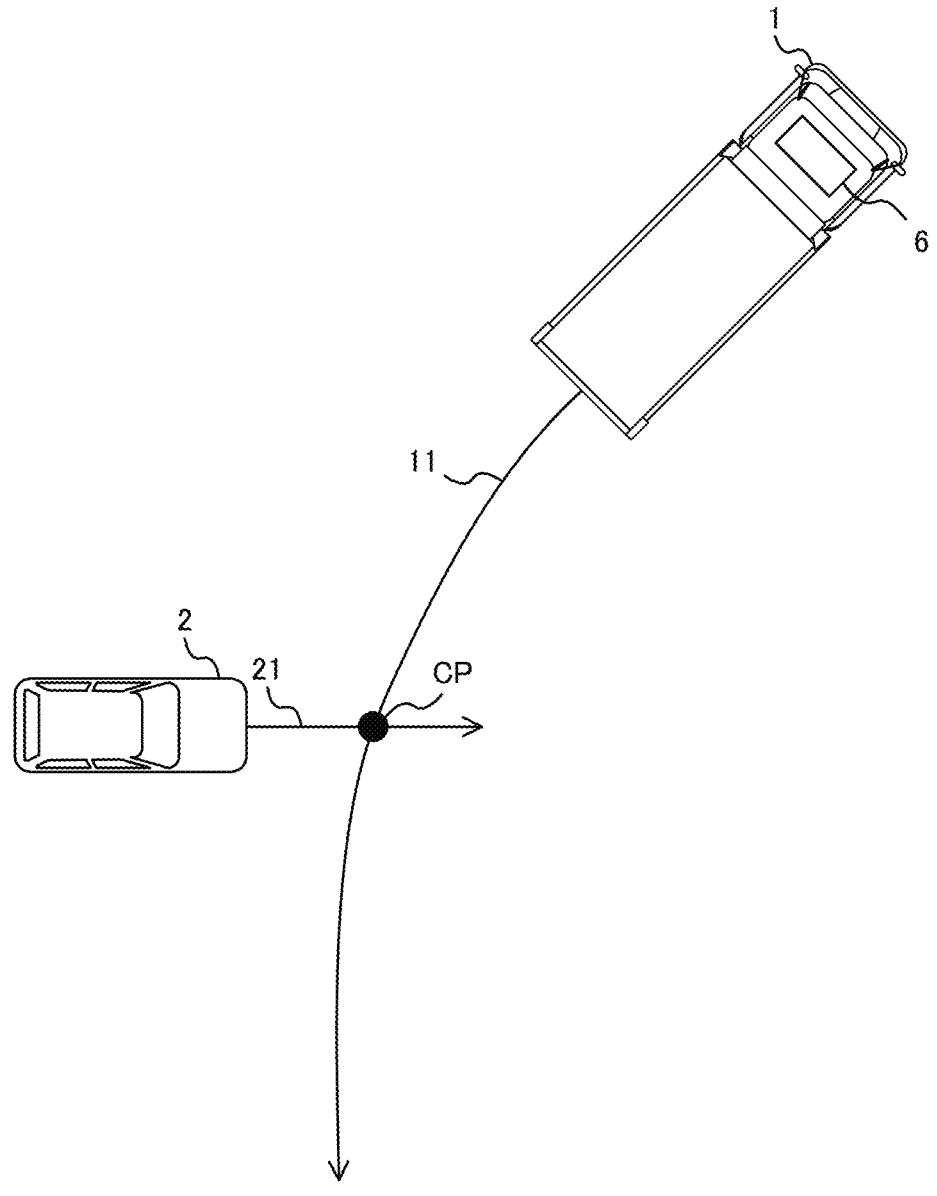
FIG. 1 illustrates an overview of a driving assistance apparatus.
Figure 2:
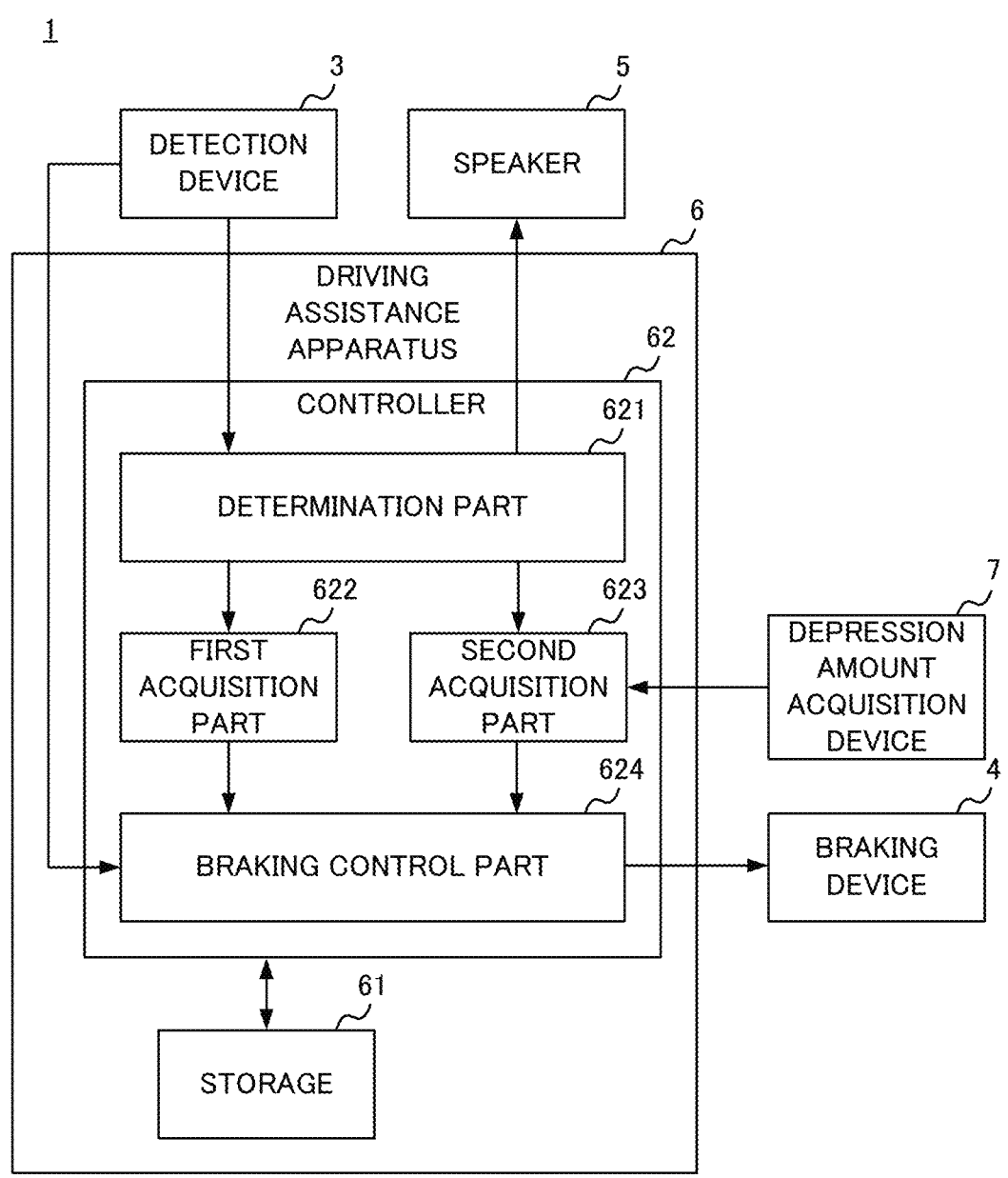
FIG. 2 illustrates a configuration of the driving assistance apparatus.

A configuration of a driving assistance apparatus 6 mounted on a reversing vehicle 1 will be described with reference to FIGS. 1 and 2. FIG. 1 illustrates an overview of the driving assistance apparatus 6. FIG. 2 illustrates a configuration of the driving assistance apparatus 6.

A reversing vehicle 1 is a vehicle that is reversing. The reversing vehicle 1 is a truck, for example, but may be a passenger car. The reversing vehicle 1 has a detection device 3, a braking device 4, a speaker 5, and a driving assistance apparatus 6 mounted thereon.

A moving object 2 is an object that is present around the reversing vehicle 1 and is approaching the reversing vehicle 1. The moving object 2 is another vehicle (a motorcycle or a passenger car), a pedestrian, or a bicycle, for example, but is not limited thereto.

The detection device 3 detects the moving object 2 around the reversing vehicle 1. For example, the detection device 3 detects a relative position, a relative distance, and a relative speed of the moving object 2 with respect to the reversing vehicle 1 by analyzing a captured image of an area behind the reversing vehicle 1 in its direction of travel. The detection device 3 may detect the relative position and the relative speed of the moving object 2 with respect to the reversing vehicle 1 by analyzing scanning data of Laser Imaging Detection and Ranging (LIDAR) that scans the area behind the reversing vehicle 1 in its direction of travel, or may detect the relative position and the relative speed of the moving object 2 with respect to the reversing vehicle 1 using other methods. Further, the detection device 3 may detect the type of the moving object 2 by analyzing a captured image or scanning data. Specifically, the detection device 3 detects whether the moving object 2 is a pedestrian or a light vehicle such as a bicycle, or whether the moving object 2 is a vehicle.

The detection device 3 estimates an estimated path 21 of the moving object 2. For example, the detection device 3 estimates the estimated path 21 of the moving object 2 on the basis of a relative position, a relative distance, and a relative speed of the moving object 2 with respect to the detected reversing vehicle 1, but may estimate the estimated path using other methods.

The braking device 4 is a device for decelerating the reversing vehicle 1. For example, the braking device 4 is at least any of a drum brake or an auxiliary brake that generates a braking force. The drum brake achieves a braking force by pressing a brake shoe against a drum rotating together with a wheel of the reversing vehicle 1. The auxiliary brake is at least any of i) a retarder that achieves a braking force by directly applying a load to an output shaft of an engine of the reversing vehicle 1 or ii) an exhaust brake that enhances an effect of engine braking by utilizing rotational resistance of the engine.

The speaker 5 is a device that outputs sound. The speaker 5 is controlled by the driving assistance apparatus 6 to output sound. It should be noted that the speaker 5 may be a buzzer that outputs a beeping sound or a transmission sound.

A depression amount acquisition device 7 is a device that acquires an amount of brake pedal depression. The depression amount acquisition device 7 inputs an amount of brake pedal depression to the driving assistance apparatus 6. The depression amount acquisition device 7 is a sensor provided on a brake pedal, for example.

The driving assistance apparatus 6 assists driving of a driver of the reversing vehicle 1. For example, the driving assistance apparatus 6 assists in avoiding a collision between the reversing vehicle 1 and the moving object 2. Specifically, if the moving object 2 approaches an estimated path 11 through which the reversing vehicle 1 is estimated to pass, the driving assistance apparatus 6 executes control for assisting with collision avoidance. The driving assistance apparatus 6 estimates the estimated path 11. The estimated path 11 is an estimated path of the reversing vehicle 1. The driving assistance apparatus 6 estimates the estimated path 11 on the basis of an angle and angular velocity of a steering wheel of the reversing vehicle 1 and speed and acceleration of the reversing vehicle 1. It should be noted that a known technique can be used as a method for estimating the estimated path 11.

The driving assistance apparatus 6 includes a storage 61 and a controller 62. The storage 61 is a storage medium including a Read Only Memory (ROM), a Random Access Memory (RAM), a hard disk, and the like. The storage 61 stores a program executed by the controller 62.

The controller 62 is a calculation resource including a processor such as a Central Processing Unit (CPU). The controller 62 implements functions as a determination part 621, a first acquisition part 622, a second acquisition part 623, and a braking control part 624 by executing the program stored in the storage 61.

The determination part 621 determines whether or not the reversing vehicle 1 and the moving object 2 are at risk of a collision. Specifically, the determination part 621 determines that the reversing vehicle 1 and the moving object 2 are at risk of a collision if the estimated path 11 of the reversing vehicle 1 and the estimated path 21 of the moving object 2 intersect with each other. More specifically, the determination part 621 determines that the reversing vehicle 1 and the moving object 2 are at risk of a collision if the reversing vehicle 1 and the moving object 2 arrive at an intersection position CP, where the estimated path 11 of the reversing vehicle 1 and the estimated path 21 of the moving object 2 intersect with each other, at the same timing. The determination part 621 determines that the reversing vehicle 1 and the moving object 2 do not collide with each other if the estimated path 11 of the reversing vehicle 1 and the estimated path 21 of the moving object 2 do not intersect with each other. In the following, a time at which the determination part 621 determines that the reversing vehicle 1 and the moving object 2 are at risk of a collision is referred to as a reference time.

If the determination part 621 determines that the reversing vehicle 1 and the moving object 2 are at risk of a collision, the determination part 621 causes the speaker 5 to output a warning sound that notifies of an impending collision between the reversing vehicle 1 and the moving object 2. Thus, the driver of the reversing vehicle 1 recognizes that there is a risk of collision between the reversing vehicle 1 and the moving object 2. In the following description, it is assumed that the driver who recognizes that there is a risk of collision between the reversing vehicle 1 and the moving object 2 depresses the brake pedal.

If the reversing vehicle 1 and the moving object 2 are determined to be at risk of a collision, the first acquisition part 622 acquires a first braking force enabling avoidance of a collision between the reversing vehicle 1 and the moving object 2. The first braking force is a braking force that results in stopping the reversing vehicle 1 before the reversing vehicle 1 and the moving object 2 collide with each other. Specifically, the first braking force is a braking force that results in deceleration to stop the reversing vehicle 1 before a time until collision between the reversing vehicle 1 and the moving object 2 elapses. The time until collision is a time required for the reversing vehicle 1 and the moving object 2 to reach the intersection position CP while maintaining the speed determined at the reference time.

The first braking force is represented by a function including a time as a variable and deceleration as a coefficient. The first braking force is represented by a linear function including i) an elapsed time from the reference time as a variable and ii) deceleration as a coefficient. For example, the deceleration is a ratio of the speed of the reversing vehicle 1 at the reference time with respect to a value obtained by subtracting a predetermined time from the time until collision. The predetermined time is determined in consideration of safety and is 200 milliseconds, for example, but is not limited thereto. As a specific example, if the time until collision is 2000 milliseconds, the first acquisition part 622 acquires a linear function, as a function representing the first braking force, using i) an elapsed time as a variable and ii) deceleration, obtained by dividing the speed of the reversing vehicle 1 at the reference time by 1800 milliseconds, as a coefficient.

A second acquisition part 623 acquires a second braking force corresponding to the amount of brake pedal depression inputted from the depression amount acquisition device 7. It is assumed that the relationship between the amount of depression and the second braking force is stored in the storage 61. Specifically, the storage 61 stores a data table associating each of a plurality of amounts of depression having different magnitudes with the second braking force corresponding to each amount of depression. It should be noted that, in the present embodiment, it is assumed that the driver increases an amount of brake pedal depression with a constant force, and the second acquisition part 623 acquires the second braking force that increases in accordance with the increased amount of brake pedal depression.

The braking control part 624 controls the braking device 4 to cause the reversing vehicle 1 to generate the braking force. If the determination part 621 determines that the reversing vehicle 1 and the moving object 2 are at risk of a collision, the braking control part 624 causes the braking device 4 to generate the first braking force or the second braking force. Details of an operation of the braking control part 624 will be described later.

Figure 3:
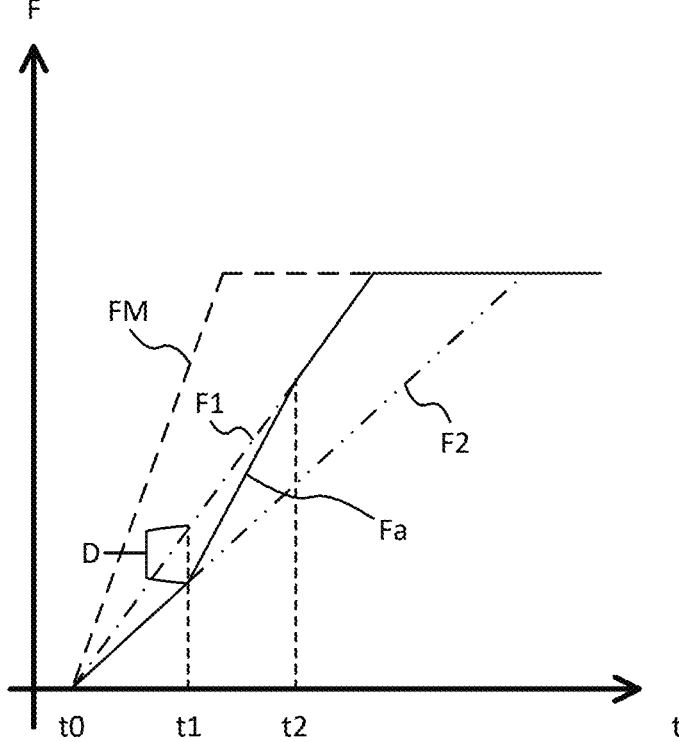
FIG. 3 illustrates a braking force that a reversing vehicle 1 is caused to generate.

FIG. 3 illustrates the braking force that the reversing vehicle 1 is caused to generate. In FIG. 3, the horizontal axis represents time t, and the vertical axis represents a braking force F. A reference time t0 is a time at which the determination part 621 determines that the reversing vehicle 1 and the moving object 2 are at risk of a collision. A dash-dotted line F1 represents a change over time of the first braking force. The first braking force increases over time at an increasing rate corresponding to the deceleration.

A dash-double-dot line F2 represents a change over time of the second braking force. The second braking force increases in accordance with the increased amount of brake pedal depression. As shown in FIG. 3, the second braking force is smaller than the first braking force, and an increasing rate of the second braking force is smaller than an increasing rate of the first braking force.

A broken line FM shows a change over time of a maximum braking force. The maximum braking force is the greatest braking force that the reversing vehicle 1 can generate. Specifically, the maximum braking force is a braking force that decelerates the reversing vehicle 1 at the maximum deceleration that the reversing vehicle 1 can generate. A solid line Fa represents a change over time of the braking force that the braking control part 624 actually causes the reversing vehicle 1 to generate.

Figure 4:
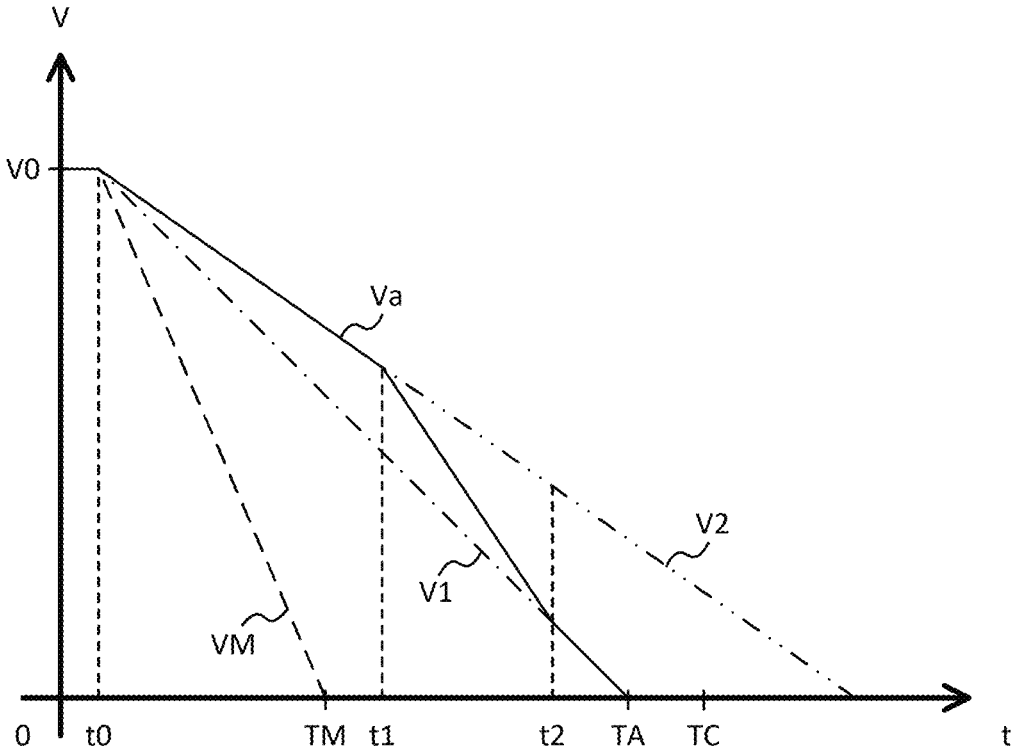
FIG. 4 illustrates a change in the speed of the reversing vehicle.

FIG. 4 illustrates a change in the speed of the reversing vehicle 1. In FIG. 4, the horizontal axis represents the time t and the vertical axis represents speed V of the reversing vehicle 1. A time TC is a time at which the reversing vehicle 1 and the moving object 2 are expected to collide with each other. In other words, the time TC is a time at which the time until collision has elapsed from the reference time t0.

A dash-dotted line V1 represents a change of the speed of the reversing vehicle 1 if the vehicle is decelerated with the first braking force. If the braking device 4 decelerates the reversing vehicle 1 with the first braking force, the reversing vehicle 1 can stop at a time TA, which is before the time TC, thereby avoiding the collision between the reversing vehicle 1 and the moving object 2. A dash-double-dot line V2 represents a change in the speed of the reversing vehicle 1 if the vehicle is decelerated with the second braking force. If the braking device 4 decelerates the reversing vehicle 1 with the second braking force, the reversing vehicle 1 is expected to stop after the time TC, and thus the reversing vehicle 1 and the moving object 2 may collide with each other.

Therefore, if the second braking force is smaller than the first braking force and the reversing vehicle 1 may collide with the moving object 2, the braking control part 624 causes the reversing vehicle 1 to generate the first braking force. Specifically, if the first braking force is smaller than the maximum braking force of the reversing vehicle 1 and the second braking force is smaller than the first braking force, the braking control part 624 increases the braking force of the reversing vehicle 1 until the braking force reaches the first braking force. More specifically, the braking control part 624 causes the reversing vehicle 1 to continue generating the second braking force while the second braking force is smaller than the first braking force and a difference between the first braking force and the second braking force is less than a predetermined value D.

If the second braking force continues to be smaller than the first braking force and the difference between the first braking force and the second braking force becomes equal to or greater than the predetermined value D, the braking control part 624 increases the braking force of the reversing vehicle 1 until the braking force reaches the first braking force. The braking control part 624 sets the predetermined value D so that the braking force can be the first braking force by the time TC at which the collision is expected. In this way, the braking control part 624 enables the driver to operate the reversing vehicle 1 within a range in which a collision can be avoided.

As shown in FIG. 3, the braking control part 624 causes the reversing vehicle 1 to generate the second braking force from the reference time t0 the time t1. The braking control part 624 increases the braking force at an increasing rate that is greater than the increasing rate of the second braking force from the time t1 at which the difference between the first braking force and the second braking force becomes equal to or greater than the predetermined value D. Then, at a time t2 that is after the time t1, the braking force generated by the braking control part 624 becomes the first braking force. The braking control part 624 increases the braking force from the time t2 using a function representing the first braking force.

A solid line Va in FIG. 4 represents a change in the speed V of the reversing vehicle 1 when the reversing vehicle 1 decelerates with the braking force the braking control part 624 causes the reversing vehicle 1 to generate. The speed of the reversing vehicle 1 is reduced at a second deceleration corresponding to the second braking force from the reference time t0 the time t1. Subsequently, the braking control part 624 increases the braking force until the braking force reaches the first braking force from the time t1 to the time t2, thereby increasing the deceleration of the reversing vehicle 1. Thus, the reversing vehicle 1 decelerates at a third deceleration which is larger than the second deceleration corresponding to the second braking force. Subsequently, after the time t2, the braking control part 624 causes the reversing vehicle 1 to generate the first braking force. Therefore, the speed of the reversing vehicle 1 is reduced at a first deceleration corresponding to the first braking force. It should be noted that the first deceleration is smaller than the third deceleration. The reversing vehicle 1 then stops at the time TA, which is before the time TC, thereby avoiding the collision between the reversing vehicle 1 and the moving object 2.

As described above, the braking control part 624 causes the reversing vehicle 1 to generate the first braking force that is smaller than the maximum braking force, when avoiding the collision between the reversing vehicle 1 and the moving object 2. As a result, the braking control part 624 can prevent the braking force of the reversing vehicle 1 from becoming the maximum braking force which is an excessive braking force when avoiding the collision between the reversing vehicle 1 and the moving object 2.

If the driver depresses the brake pedal sufficiently strongly, the second braking force becomes equal to or greater than the first braking force. In this case, the braking control part 624 causes the reversing vehicle 1 to generate the second braking force. Specifically, while the second braking force continues to be equal to or greater than the first braking force, the braking control part 624 causes the reversing vehicle 1 to continue generating the second braking force. Since the reversing vehicle 1 stops before the time until collision elapses if the second braking force is equal to or greater than the first braking force, the collision between the reversing vehicle 1 and the moving object 2 can be avoided only by an operation of the driver.

By the way, there are cases where the second braking force is initially equal to or greater than the first braking force but becomes smaller than the first braking force. If the driver who strongly depresses the brake pedal is startled by activation of an anti-lock brake system (ABS) and eases off the pressure on the brake pedal, for example, the second braking force may decrease to be smaller than the first braking force. In this case, the collision between the reversing vehicle 1 and the moving object 2 cannot be avoided.

Therefore, if the second braking force becomes smaller than the first braking force, the braking control part 624 causes the reversing vehicle 1 to generate the maximum braking force. For example, if the second braking force becomes smaller than the first braking force after a predetermined time elapses from the reference time t0, the braking control part 624 causes the reversing vehicle 1 to generate the maximum braking force regardless of the difference between the first braking force and the second braking force. Specifically, if the second braking force becomes smaller than the first braking force after the predetermined time elapses from the reference time t0 in a state where the second braking force continues to be equal to or greater than the first braking force, the braking control part 624 increases the braking force that the reversing vehicle 1 is caused to generate until the braking force reaches the maximum braking force. The predetermined time is a time obtained by subtracting a time required for the reversing vehicle 1, traveling at speed V0 at the reference time t0, to stop with the maximum braking force from the time until collision. As a specific example, if the time until collision is 2 seconds and the time required for stopping with the maximum braking force is 1 second, the predetermined time is 1 second. In this way, the braking control part 624 can avoid the collision between the reversing vehicle 1 and the moving object 2 even if the driver eases off the pressure on the brake pedal.

It should be noted that, if the first braking force at the reference time t0 is equal to or greater than the maximum braking force, the braking control part 624 causes the reversing vehicle 1 to generate the maximum braking force regardless of the amount that the brake pedal is depressed by the driver. In this way, the braking control part 624 can reduce damage caused by the collision between the reversing vehicle 1 and the moving object 2 even if the collision between the reversing vehicle 1 and the moving object 2 cannot be avoided.

The braking control part 624 may change the braking force that the reversing vehicle 1 is caused to generate depending on the type of the moving object 2. For example, damage in a collision when the moving object 2 is a pedestrian tends to be greater than damage in a collision when the moving object 2 is a vehicle. Therefore, if the moving object 2 is any of a pedestrian or a light vehicle such as a bicycle, the braking control part 624 gives priority to safety and causes the reversing vehicle 1 to generate the maximum braking force. Specifically, if it is determined that there is a risk of collision between the reversing vehicle 1 and the pedestrian, the braking control part 624 causes the reversing vehicle 1 to generate the maximum braking force regardless of the first braking force, the second braking force, and the time until collision (see the broken line FM in FIG. 3). More specifically, the braking control part 624 causes the reversing vehicle 1 to continue generating the maximum braking force until the reversing vehicle 1 stops. In other words, the braking control part 624 causes the reversing vehicle 1 to continue decelerating at the maximum deceleration that the reversing vehicle 1 can generate.

When decelerating at the maximum deceleration, the reversing vehicle 1 stops at a time TM, which is before the time TA when stopping occurs with the first braking force (see the broken line VM in FIG. 4). As described above, the braking control part 624 causes the reversing vehicle 1 to generate a greater braking force to stop the reversing vehicle 1 sooner, thereby improving safety for pedestrians, bicycles, and the like.

If the moving object 2 is a vehicle, the braking control part 624 causes the reversing vehicle 1 to generate the first braking force as described above. Accordingly, the braking control part 624 can prevent the braking force from being excessive when avoiding a collision between the reversing vehicle 1 and the vehicle.

[Collision Avoidance Process]

Figure 5:
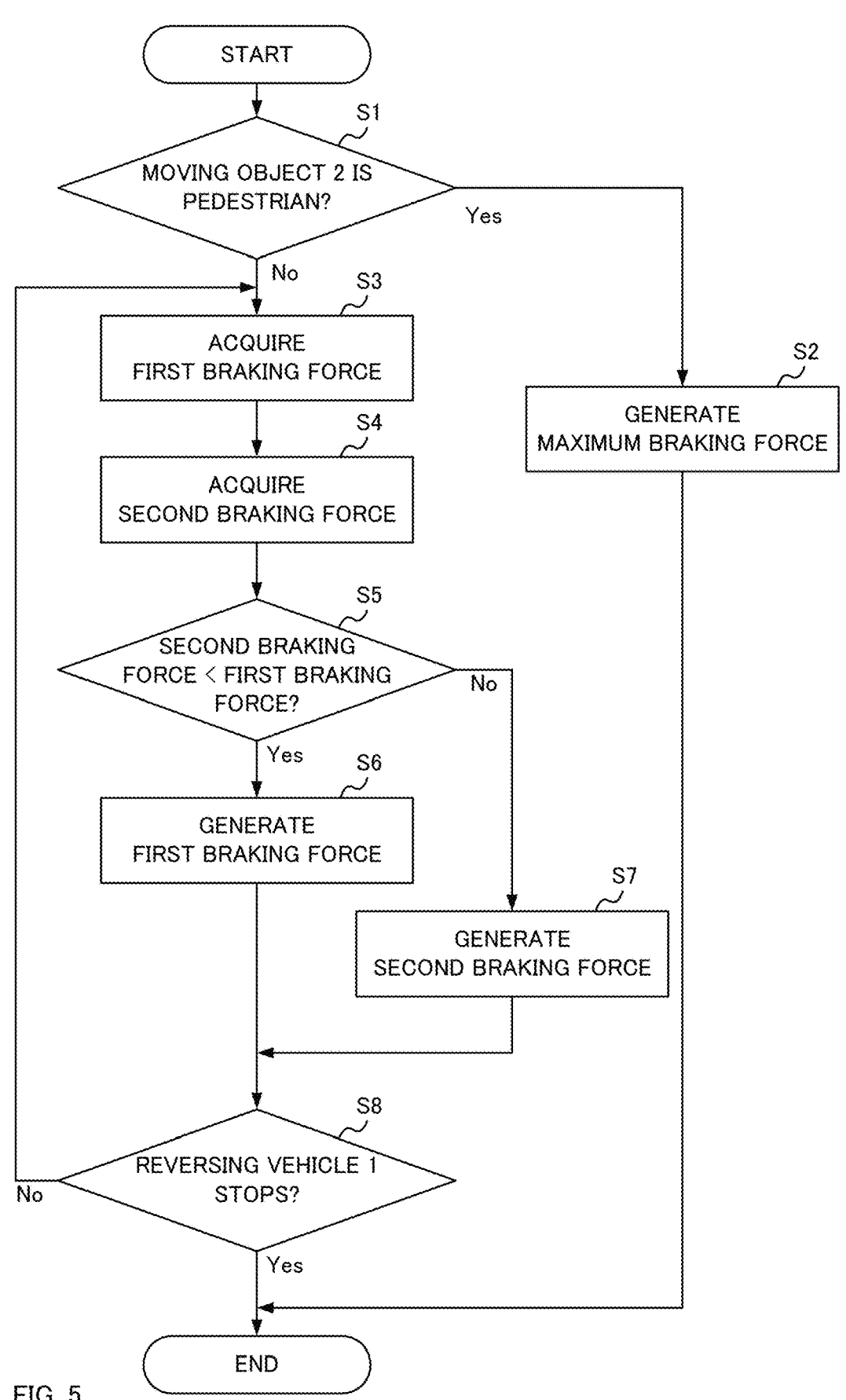
FIG. 5 is a flowchart illustrating an example of a collision avoidance process.

FIG. 5 is a flowchart illustrating an example of a collision avoidance process. The collision avoidance process is executed upon determining that there is a risk of collision between the reversing vehicle 1 and the moving object 2.

First, the braking control part 624 determines whether or not the moving object 2 is a pedestrian (step S1). Specifically, the braking control part 624 determines whether the moving object 2 is a pedestrian or a vehicle on the basis of a detection result of the detection device 3. If the moving object 2 is a pedestrian (Yes in step S1), the braking control part 624 causes the reversing vehicle 1 to generate the maximum braking force that the reversing vehicle 1 can generate (step S2). Specifically, the braking control part 624 causes the reversing vehicle 1 to continue generating the maximum braking force until the reversing vehicle 1 stops. When the reversing vehicle 1 stops, the braking control part 624 ends the collision avoidance process. The braking control part 624 causes the reversing vehicle 1 to keep generating the maximum braking force even after ending the collision avoidance process.

If the moving object 2 is a vehicle (No in step S1), the first acquisition part 622 acquires the first braking force enabling avoidance of a collision between the reversing vehicle 1 and the moving object 2 (step S3). Further, the second acquisition part 623 acquires the second braking force corresponding to the current amount of brake pedal depression (step S4). It should be noted that step S4 may be performed before step S3, or may be performed in parallel with step S3.

The braking control part 624 determines whether or not the second braking force is smaller than the first braking force (step S5). If the second braking force is smaller than the first braking force (Yes in step S5), the braking control part 624 causes the reversing vehicle 1 to generate the first braking force (step S6). Specifically, the braking control part 624 increases the braking force until the braking force reaches the first braking force. If the second braking force is equal to or greater than the first braking force (No in step S5), the braking control part 624 causes the reversing vehicle 1 to generate the second braking force (step S7).

If the braking control part 624 causes the reversing vehicle 1 to generate the first braking force or the second braking force, the braking control part 624 determines whether or not the reversing vehicle 1 has stopped (step S8). If the reversing vehicle 1 has not stopped (No in step S8), the braking control part 624 repeatedly executes steps S3 to S8 until the reversing vehicle 1 stops. If the reversing vehicle 1 has stopped (Yes in step S8), the braking control part 624 ends the collision avoidance process. Specifically, the braking control part 624 ends the collision avoidance process. The braking control part 624 causes the reversing vehicle 1 to keep generating the first braking force or the second braking force even after ending the collision avoidance process.

[Effects of Driving Assistance Apparatus 6]

As described above, the driving assistance apparatus 6 causes the reversing vehicle 1 to generate the first braking force if i) the first braking force enabling avoidance of a collision between the reversing vehicle 1 and the moving object 2 is smaller than the maximum braking force and ii) the second braking force determined on the basis of an amount of brake pedal depression is smaller than the first braking force. Accordingly, the driving assistance apparatus 6 can avoid the collision between the reversing vehicle 1 and the moving object 2 while suppressing the maximum braking force to be generated, thereby preventing excessive braking force when avoiding the collision between the reversing vehicle 1 and the moving object 2.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. A driving assistance apparatus comprising:
a first acquisition part that acquires a first braking force enabling avoidance of a collision between a reversing vehicle that is reversing and a moving object approaching the reversing vehicle;
a second acquisition part that acquires a second braking force on the basis of an amount of brake pedal depression; and
a braking control part that causes the reversing vehicle to generate the first braking force if the first braking force is smaller than a maximum braking force of the reversing vehicle and the second braking force is smaller than the first braking force.

2. The driving assistance apparatus according to claim 1, wherein
the braking control part causes the reversing vehicle to generate the second braking force if the second braking force is equal to or greater than the first braking force.

3. The driving assistance apparatus according to claim 2, wherein
the braking control part causes the reversing vehicle to generate the maximum braking force if the second braking force becomes smaller than the first braking force.

4. The driving assistance apparatus according to claim 2, wherein
the braking control part causes the reversing vehicle to generate the maximum braking force if the second braking force becomes smaller than the first braking force after a predetermined time elapses from a time at which it is determined that the reversing vehicle and the moving object are at risk of a collision.

5. The driving assistance apparatus according to claim 4, wherein
the braking control part causes the reversing vehicle to generate the maximum braking force if the first braking force at the time is equal to or greater than the maximum braking force.

6. The driving assistance apparatus according to claim 1, wherein
the braking control part causes the reversing vehicle to generate the maximum braking force if the moving object is a pedestrian regardless of the first braking force and the second braking force, and
the braking control part causes the reversing vehicle to generate the first braking force if the moving object is a vehicle, the first braking force is smaller than the maximum braking force, and the second braking force is smaller than the first braking force.

7. The driving assistance apparatus according to claim 1, wherein
the first acquisition part acquires the first braking force that results in deceleration to stop the reversing vehicle before a time until collision between the reversing vehicle and the moving object elapses.

8. The driving assistance apparatus according to claim 1, wherein
the braking control part, causing the reversing vehicle to generate the second braking force, increases a braking force of the reversing vehicle until the braking force reaches the first braking force if the first braking force is smaller than the maximum braking force and the second braking force caused to be generated is smaller than the first braking force.

9. The driving assistance apparatus according to claim 8, wherein
the first braking force is represented by a function including i) an elapsed time, as a variable, from a time at which it is determined that the reversing vehicle and the moving object are at risk of a collision and ii) deceleration, as a coefficient, to stop the reversing vehicle before a time until collision between the reversing vehicle and the moving object elapses from the time, and
the braking control part causes the reversing vehicle to generate the first braking force by increasing a braking force of the reversing vehicle until the braking force reaches the first braking force if the second braking force continues to be smaller than the first braking force and a difference between the first braking force and the second braking force becomes equal to or greater than a predetermined value.

10. The driving assistance apparatus according to claim 9, wherein
the coefficient is a ratio of speed of the reversing vehicle at the time with respect to a value obtained by subtracting a predetermined time from the time until collision.

11. A method for controlling a driving assistance apparatus, executed by a processor mounted on a reversing vehicle that is reversing, the method comprising the steps of:
acquiring a first braking force enabling avoidance of a collision between the reversing vehicle and a moving object approaching the reversing vehicle;
acquiring a second braking force on the basis of an amount of brake pedal depression; and
causing the reversing vehicle to generate the first braking force if the first braking force is smaller than a maximum braking force of the reversing vehicle and the second braking force is smaller than the first braking force.

12. A non-transitory storage medium storing a program for causing a processor, mounted on a reversing vehicle that is reversing, to function as:

a first acquisition part that acquires a first braking force enabling avoidance of a collision between the reversing vehicle and a moving object approaching the reversing vehicle;

a second acquisition part that acquires a second braking force on the basis of an amount of brake pedal depression; and a braking control part that causes the reversing vehicle to generate the first braking force if the first braking force is smaller than a maximum braking force of the reversing vehicle and the second braking force is smaller than the first braking force.

\*    \*    \*    \*    \*